US009836899B2

(12) United States Patent
Menzel

(10) Patent No.: US 9,836,899 B2
(45) Date of Patent: *Dec. 5, 2017

(54) SYSTEMS AND METHODS FOR PROGRAMMING A CREDENTIAL READER

(71) Applicant: XceedID Corporation, Golden, CO (US)

(72) Inventor: John D. Menzel, Highlands Ranch, CO (US)

(73) Assignee: XceedId Corporation, Golden, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/149,479

(22) Filed: May 9, 2016

(65) Prior Publication Data

US 2016/0253854 A1 Sep. 1, 2016

Related U.S. Application Data

(63) Continuation of application No. 14/215,850, filed on Mar. 17, 2014, now Pat. No. 9,336,420, which is a
(Continued)

(51) Int. Cl.
*G07C 9/00* (2006.01)
*G06F 21/31* (2013.01)
(Continued)

(52) U.S. Cl.
CPC .......... *G07C 9/00111* (2013.01); *G06F 21/31* (2013.01); *G06F 21/45* (2013.01);
(Continued)

(58) Field of Classification Search
CPC ..... G06F 21/31; G06F 21/45; G06K 7/10227; H04W 12/06
See application file for complete search history.

(56) References Cited

U.S. PATENT DOCUMENTS

| 7,012,503 B2 | 3/2006 | Nielsen |
| 8,710,962 B2 * | 4/2014 | Menzel ............... H04B 5/0031 235/382 |

(Continued)

FOREIGN PATENT DOCUMENTS

| KR | 20050034173 | 4/2005 |
| KR | 20070094078 | 9/2007 |
| WO | 2007139909 | 12/2007 |

OTHER PUBLICATIONS

Communication received from European Patent Office for EP Appl. No. 09701164.7-1852, dated Feb. 11, 2015, 5 pages.

(Continued)

*Primary Examiner* — Andrew Bee
(74) *Attorney, Agent, or Firm* — Michael Best & Friedrich LLP

(57) ABSTRACT

A credential reader update system includes a server operable to provide a credential reader update via a cellular telephone interface, and a plurality of credential readers. Each credential reader communicates with a presented credential at a credential reader frequency, wherein each credential reader has a credential reader interface having a range. A portable update device is movable into and out of the range, and is operable to receive the credential reader update via the cellular telephone interface. A credential reader update application is included in the portable update device, and is operable to uniquely identify the particular credential reader to be updated. The portable update device transfers the credential reader update to the credential reader via the credential reader interface, and the credential reader update includes firmware instructions that cause the credential reader to perform communications with the presented credential at a second frequency different than the credential reader frequency.

25 Claims, 9 Drawing Sheets

Related U.S. Application Data continuation of application No. 12/741,172, filed as application No. PCT/US2009/030194 on Jan. 6, 2009, now Pat. No. 8,710,962.

(60) Provisional application No. 61/019,560, filed on Jan. 7, 2008.

(51) Int. Cl.
| | |
|---|---|
| *G06F 21/45* | (2013.01) |
| *H04B 5/00* | (2006.01) |
| *H04B 5/02* | (2006.01) |
| *H04L 29/06* | (2006.01) |
| *H04W 12/06* | (2009.01) |
| *G06K 7/10* | (2006.01) |
| *G06Q 20/20* | (2012.01) |
| *H04W 76/02* | (2009.01) |
| *H04W 88/02* | (2009.01) |
| *H04W 88/06* | (2009.01) |

(52) U.S. Cl.
CPC ..... *G06K 7/10227* (2013.01); *G06K 7/10366* (2013.01); *G06Q 20/206* (2013.01); *H04B 5/0031* (2013.01); *H04B 5/0062* (2013.01); *H04B 5/02* (2013.01); *H04L 63/0492* (2013.01); *H04W 12/06* (2013.01); *H04W 76/023* (2013.01); *H04W 76/02* (2013.01); *H04W 88/02* (2013.01); *H04W 88/06* (2013.01)

(56) References Cited

U.S. PATENT DOCUMENTS

| | | |
|---|---|---|
| 9,336,420 B2 | 5/2016 | Menzel et al. |
| 2002/0186131 A1 | 12/2002 | Fetlis |
| 2004/0049451 A1 | 3/2004 | Berardi et al. |
| 2005/0033619 A1 | 2/2005 | Barnes et al. |
| 2005/0110609 A1 | 5/2005 | Mosgrove |
| 2005/0242921 A1 | 11/2005 | Zimmerman et al. |
| 2006/0169768 A1 | 8/2006 | Gangi |
| 2006/0169769 A1 | 8/2006 | Boyarsky et al. |
| 2006/0224901 A1 | 10/2006 | Lowe |
| 2006/0236407 A1 | 10/2006 | Mergenthaler |
| 2007/0115092 A1 | 5/2007 | Hsu et al. |
| 2007/0135164 A1 | 6/2007 | Lee |
| 2007/0139190 A1 | 6/2007 | Tanner et al. |
| 2007/0194104 A1 | 8/2007 | Fukuda et al. |
| 2007/0202807 A1 | 8/2007 | Kim |
| 2010/0261453 A1 | 10/2010 | Menzel |
| 2011/0143661 A1 | 6/2011 | Hartwig et al. |

OTHER PUBLICATIONS

Extended Search Report from the European Patent Office for Application No. 9700681.1 dated Mar. 6, 2012 (5 pages).
PCT/US2009/030194 International Search Report on Patentability dated Aug. 21, 2009 (2 pages).
PCT/US2009/030202 International Search Report on Patentability dated Jun. 22, 2009 (2 pages).
Search Report from European Patent Office for Application No. 09701164.7 dated May 7, 2012 (7 pages).
United States Patent Office Action for U.S. Appl. No. 12/741,172 dated Dec. 4, 2012 (15 pages).
United States Patent Office Action for U.S. Appl. No. 12/741,172 dated Aug. 19, 2013 (17 pages).
United States Patent Office Notice of Allowance for U.S. Appl. No. 12/741,172 dated Dec. 9, 2013 (9 pages).

* cited by examiner

SYSTEMS AND METHODS FOR PROGRAMMING A CREDENTIAL READER

BACKGROUND

The present invention is related to radio frequency identification (RFID) readers, and more particularly, to systems and methods for updating an RFID reader using a mobile credential.

RFID readers are capable of reading a credential presented within a defined proximity of the RFID reader. Such a credential read may be used as the basis of, for example, allowing access or another operation requiring identification. In many cases it is not possible to modify an installed RFID reader, while in other cases, any modification is both costly and time consuming. Such modifications may require, for example, physically opening the RFID reader and replacing an internal read only memory maintaining firmware instructions. As another example, updating an RFID reader may include replacing a current RFID reader with a new model. While these approaches provide an ability to update or upgrade a currently installed RFID reader, they are often unacceptably cumbersome and costly.

Hence, for at least the aforementioned reasons, there exists a need in the art for advanced systems and methods for updating RFID readers.

SUMMARY

The present invention is related to radio frequency identification (RFID) readers, and more particularly, to systems and methods for updating an RFID reader using a mobile credential.

Various embodiments of the present invention provide portable update devices. Such portable update devices include a cellular telephone interface, a processor, an nfc interface, and a memory. The memory includes instructions executable by the processor to: store an RFID reader update received via the cellular telephone interface to the memory, receive an indication from the nfc interface indicating that it is receiving communications from an RFID reader, access the RFID reader update from the memory, and transfer the RFID reader update to the RFID reader via the nfc interface. In some instances of the aforementioned embodiments, the nfc interface operates at 13.56 MHz and the memory is a non-volatile memory.

Other embodiments of the present invention provide methods for updating an RFID reader. Such methods include transferring an RFID reader update to a portable update device via a wireless communication link. The portable update device is moved within proximity of the RFID reader that detects the presence of the portable update device. The RFID reader update is transferred to the RFID reader. The RFID reader update modifies operation of the RFID reader. In some instances of the aforementioned embodiments, the RFID reader update causes a change in an authorization code of the RFID reader. As such, a different set of credentials are authorized to the RFID reader. As some examples, the RFID reader may be used to authorize access via an access point or as part of a point of sale device.

In particular instances of the aforementioned embodiments, the portable update device is a cellular telephone that supports near field communication. In some such instances, the near field communication are used to transfer the RFID reader update to the RFID reader using a programming frequency and protocol recognized by the RFID reader. Where the RFID reader is operable to authorize access via the access point when an appropriate credential is brought within proximity of the RFID reader, the RFID reader update may render the credential unauthorized. In other cases, the RFID reader update renders the credential authorized. In yet other cases, the RFID reader update renders the RFID reader able to receive information from a credential at a new frequency.

Yet other embodiments of the present invention provide RFID reader update systems. Such systems include a server, an RFID reader, and a portable update device. The server is operable to provide an RFID reader update via a communication network. The RFID reader has an nfc interface. The portable update device is operable to receive the RFID reader update via the communication network, and to transfer the RFID reader update to the RFID reader via the nfc interface. In particular instances of the aforementioned embodiments, the nfc interface operates at 13.56 MHz. In some instances of the aforementioned embodiments, the portable update device is a cellular telephone, and wherein the RFID reader update is received via the communication network via a cellular telephone interface. In some cases, the RFID reader is implemented as part of a point of sale device, while in other cases, the RFID reader is used to control access to a location.

In various instances of the aforementioned embodiments, the RFID reader update causes a change in an authorization code of the RFID reader. In some cases, the RFID reader is associated with an access point. In such cases, by authorizing a credential to the RFID reader the access point is opened. In various instances of the aforementioned embodiments, the RFID reader includes a processor. In such instances, the RFID reader update may include instructions executable by the processor to modify the function performed by the RFID reader. In a particular case, the portable update device transmits authorization information at a first frequency, and the RFID reader is operable to receive authorization information at a second frequency. The RFID reader update renders the RFID reader able to receive authorization information at the first frequency.

In another construction, a credential reader update system includes a server operable to provide a credential reader update via a cellular telephone interface, and a plurality of credential readers. Each credential reader is operable to communicate with a presented credential at a credential reader frequency, wherein each credential reader has a credential reader interface having a credential reader interface range. A portable update device is selectively movable into and out of the credential reader interface range, wherein the portable update device is operable to receive the credential reader update via the cellular telephone interface. A credential reader update application is included in the portable update device, and is operable to uniquely identify the particular credential reader to be updated. The portable update device is operable to transfer the credential reader update to the credential reader via the credential reader interface, and wherein the credential reader update includes firmware instructions that cause the credential reader to perform communications with the presented credential at a second frequency different than the credential reader frequency.

In another construction, a method for updating a credential reader that is operable to read a presented credential at a credential reader frequency includes transferring a credential reader update to a portable update device via a cellular telephone interface, the portable update device movable into and out of a credential reader interface range, detecting the portable update device within the credential reader interface range of the credential reader, and determining if the credential reader is a particular credential reader that is to be updated. The method also includes transferring the credential reader update to the credential reader via the credential reader interface in response to a positive determination that the credential reader is the particular credential reader that is to be updated, wherein the credential reader operates consistent with the credential reader update, and wherein the credential reader update includes firmware instructions that cause the credential reader to perform communications with the presented credential at a second frequency in addition to the credential reader frequency.

In another construction, a remote access system includes a credential reader, a credential having a first communication interface that communicates using a cellular telephone network and a second communication interface that is different than the first communication interface, the credential operable to receive authorization information and to communicate with the credential reader, and a server operable to receive an authorization request for the credential and to access the credential to provide the authorization information. A portable device is operable to send the authorization request to the server from the credential, and a reader authorization application is included in the credential, wherein the credential is operable to transfer an authorization code to the credential reader via the second communication interface that is different than the first communication interface, wherein the portable device is separate from the credential.

In yet another construction, a method for remotely authorizing access includes transferring a request for access from a credential to a portable device which is separate from the credential, determining a grant of access, sending an authorization request from the portable device to a server, the authorization request identifying the grant of access, and uploading authorization information for a credential reader to the credential. The method also includes initiating a communication with a credential reader interface in response to positioning the credential within a credential reader interface range of the credential reader, requesting authorization information from the credential, and transferring the authorization information from the credential to the credential reader via the credential reader interface.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 1a depicts a cellular telephone including an RFID reader update module capable of updating an RFID reader via a near field communication protocol in accordance with various embodiments of the present invention;

DETAILED DESCRIPTION

Figure 11:
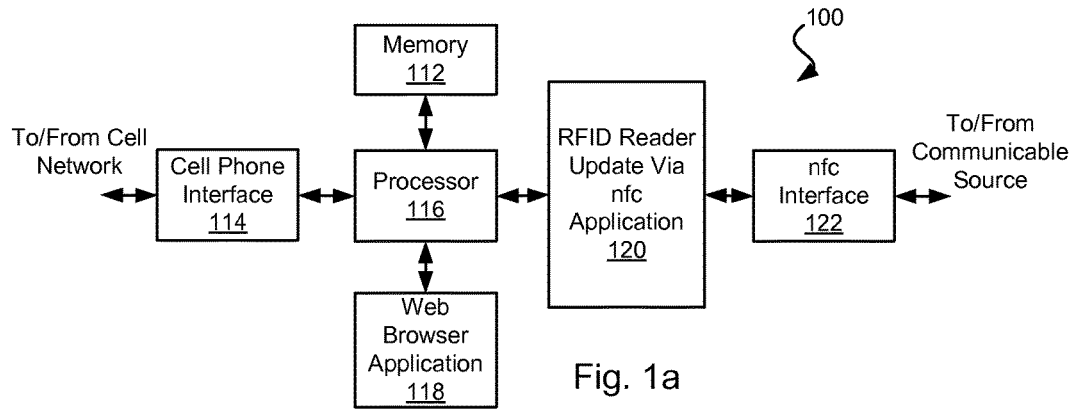
FIG. 11 is a flow diagram showing a method in accordance with one or more embodiments of the present invention for emergency location access authorization.
Figure 11:
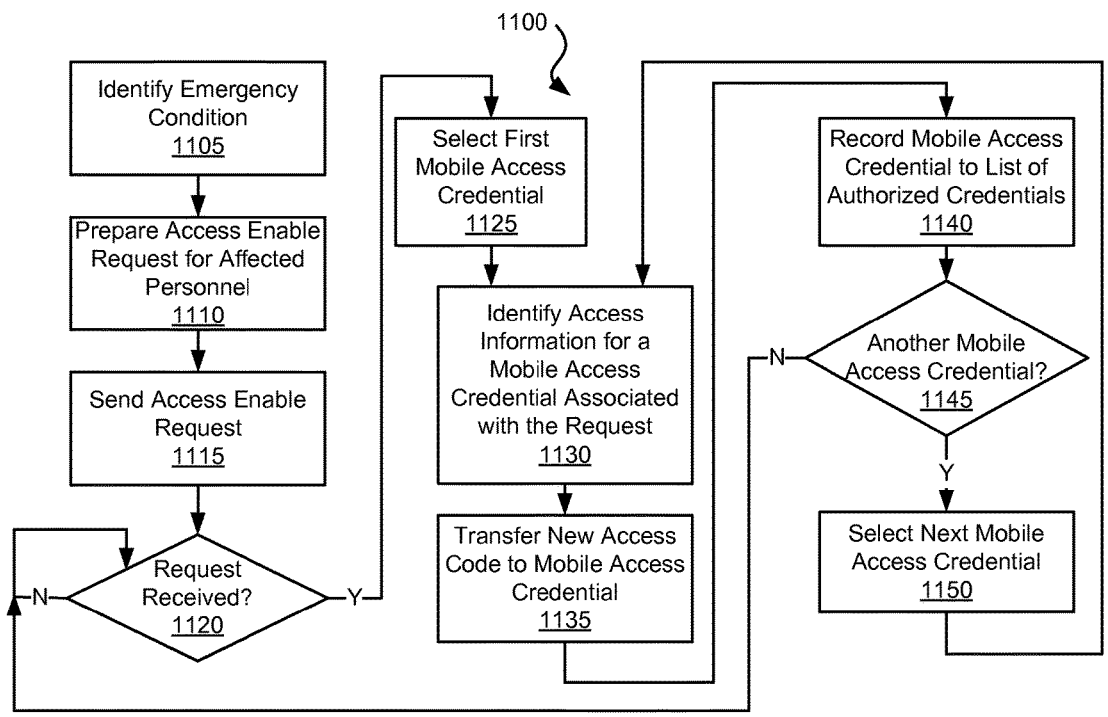

The present invention is related to radio frequency identification (RFID) readers, and more particularly, to systems and methods for updating an RFID reader using a mobile credential.

Some embodiments of the present invention provide systems and methods for updating an RFID reader. As used herein, the phrase "RFID reader" is used in its broadest sense to mean any device that is capable wireless interaction with a credential, and upon recognizing or authorizing the credential, a particular function is implemented. Such a function may be, but is not limited to, performing a payment or value transfer from an individual associated with the credential or allowing access via an access point associated with the RFID reader. The performed function and/or access to the performed function may be modified by providing an RFID reader update to the RFID reader. As used herein, the phrase "RFID reader update" is used in its broadest sense to mean any modification that operates to change the functionality of the RFID reader. As just one example, an RFID reader update may be a set of firmware or software instructions written to the memory of the RFID reader that cause a change in functionality of the RFID reader. The change in functionality may be, but is not limited to, a change in authorization codes accepted by the RFID reader or a change in the function of the RFID reader upon successfully authorizing a credential. Based upon the disclosure provided herein, one of ordinary skill in the art will recognize a variety of RFID reader updates that may be used in relation to different embodiments of the present invention.

As used herein, the term "credential" is used in its broadest sense to mean any portable device that includes information useful in completing an access and/or transaction. Thus, for example, a credential may be a smart card with information allowing a user of the credential to pass through an access point. Such credentials may be, but are not limited to, access control cards, smart cards, cellular telephones, personal digital assistants, and/or the like. Such credentials may be capable of communicating via a wireless communication interface. The wireless communication interface may be, but is not limited to, a radio frequency interface, an optical interface, or the like. Based upon the disclosure provided herein, one of ordinary skill in the art will recognize a variety of credentials and mechanisms for facilitating communication with RFID readers that may be used in relation to different embodiments of the present invention.

As an example, a method for updating an RFID reader is disclosed that includes transferring an RFID reader update to a portable update device via a wireless communication link. The portable update device is moved within proximity of the RFID reader that detects the presence of the portable update device. The RFID reader update is transferred to the RFID reader. The RFID reader update modifies operation of the RFID reader. As used herein, the phrase "portable update device" is used in its broadest sense to mean any portable device that is capable of interacting with an RFID reader. As defined herein, credentials may be used as portable update devices. Based upon the disclosure provided herein, one of ordinary skill in the art will recognize a variety of portable update devices that may be used in relation to different embodiments of the present invention.

In some cases, the portable update device is a cellular telephone that supports near field communication. In some such instances, the near field communication is used to transfer the RFID reader update to the RFID reader using a programming frequency and protocol recognized by the RFID reader. As used herein, the phrase "near field communication" or "nfc" (without capitalized letters) is used in its broadest sense to mean any wireless communication protocol that allows for two devices disposed close together to transfer information. As just one example, near field communication may be Near Field Communication or NFC (with capitalized letters). Such Near Field Communication may be, for example, compliant with either Near Field Communication Interface and Protocol-1 (ISO/IEC 18092/ECMA-340) or Protocol-2 (ISO/IEC 21481/ECMA-352). As specified, Near Field Communication operates at 13.56 MHz and transfers data at up to 424 Kbits/second. Near Field Communication provides the ability to both read and write between devices that are within ten centimeters of each other. The data transfer is effectuated via magnetic field induction where two loop antennas are located within one another's near field, effectively forming an air-core transformer. Near Field Communication commonly operates in either a passive communication mode or an active communication mode. In the passive communication mode, the initiating device provides a carrier field and the target device answers by modulating existing field. In this mode, the target device may draw its operating power from an electromagnetic field provided by the initiating device, thus eliminating the need for an internal power supply. In the active communication mode, both the initiating device and the target device communicate by alternately generating their own electromagnetic field. A receiving device deactivates its RF field while it is waiting for data from the other device. In this mode, both devices would typically have some access to a power source independent of the other device. As another example, near field communication may be a communication protocol consistent with the ISO 14443 proximity-card standard. Based on the disclosure provided herein, one of ordinary skill in the art will recognize a variety of near field communication protocols, techniques and/or frequencies that may be used in relation to different embodiments of the present invention.

Turning to FIG. 1a, a block diagram of a cellular telephone 100 is shown. Cellular telephone 100 includes a cellular telephone interface 114, a processor 116, a web browser application 118, an RFID reader update application 120, and an nfc interface 122. Cellular telephone interface 114 is capable of receiving and transmitting information via a cellular telephone link. Cellular telephone interface 114 may be any cellular telephone interface known in the art. Any received information is provided to a processor 116. Similarly, processor 116 provides information that is to be transmitted to cellular telephone interface 114. Processor 116 may be any device capable of executing software or firmware instructions to cause cellular telephone 100 to perform defined functions. A memory 112 is included that is capable of storing information that is to be used by cellular telephone 100. In some cases, memory 112 stores software or firmware instructions executable by processor 116 to perform defined functions. Memory 112 may be any device capable of storing data. For example, memory may be an SRAM, a DRAM, a Flash DRAM, an EPROM, EEPROM, and/or the like. Based on the disclosure provided herein, one of ordinary skill in the art will recognize a variety of memory types and/or combinations thereof that may be used to implement memory 112. Web browser application 118 allows for searching the Internet via cellular telephone interface 114 as is known in the art.

RFID reader update application 120 is capable of providing an RFID reader update in a format that nfc interface 122 is capable of transmitting to an RFID reader via a near field communication link. In general, the RFID reader update includes a first set of instructions operable to uniquely identify the particular RFID reader that is to be updated. A second set of instructions are included that are operable to cause an RFID reader to write subsequent information to a defined location in the memory of the RFID reader. The RFID reader update also includes subsequent data that, in accordance with the preceding write instructions, is written to the defined location in the RFID reader memory. This subsequent information may be either data or firmware instructions designed to modify operation of the RFID reader. The subsequent data may include, for example, replacement or additional authorization codes. As another example, the subsequent data may include firmware instructions causing the RFID reader to perform communications with presented credentials at additional frequencies. Based on the disclosure provided herein, one of ordinary skill in the art will recognize a variety of data and/or firmware instructions that may be prepared for writing by RFID reader update application 120. The RFID reader update may also include a final set of instructions closing off communication. The nfc interface 122 may be any interface known in the art that is capable of carrying out near field communications with an RFID reader.

In operation, cellular telephone 100 receives an RFID reader update via cellular telephone interface 114. Processor 116 stores the RFID reader update to memory 112. When cellular telephone 100 is brought within proximity of an RFID reader, attempts to communicate with the RFID reader is performed via nfc interface 122. Once nfc communications are established with the RFID reader, the RFID reader update application 120 requests identification information from the RFID reader. Where the identification information corresponds to the RFID reader update to be programmed, the RFID reader update is pulled from memory 112 by RFID reader update application 120 and transmitted to the RFID reader via nfc interface 122.

Figure 1B:
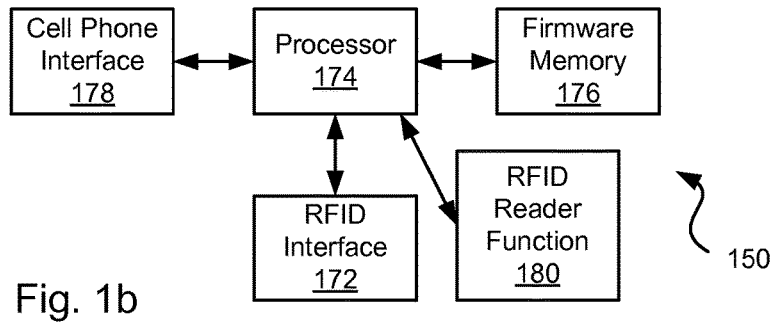
FIG. 1b depicts an RFID reader including a cellular telephone interface in accordance with some embodiments of the present invention.

Turning to FIG. 1b, an RFID reader 150 including a cellular telephone interface 178 is shown in accordance with some embodiments of the present invention. In particular, RFID reader 150 includes an RFID interface 172, a processor 174, firmware memory 176, and an RFID reader function 180. Cellular telephone interface 178 may be any cellular telephone interface known in the art that provides at least for receiving information via a cellular network. RFID interface 172 may be any interface known in the art that allows for receiving wireless communications at an RFID reader. RFID reader function 180 is a control circuit that effectuates the function that is to be performed by RFID reader 150. Thus, for example, where RFID reader 150 is used to authorize access via an access point such as a physical doorway, RFID reader function 180 provides an electronic unlock signal to a lock controlling access via the doorway when an authorized credential is brought within proximity of the RFID reader. Based upon the disclosure provided herein, one of ordinary skill in the art will recognize a variety of functions that may be implemented by RFID reader function 180. Firmware memory 176 stores instructions executable by processor 174. Firmware memory 176 may be any device capable of storing data. For example, memory may be an SRAM, a DRAM, a Flash DRAM, an EPROM, EEPROM, and/or the like. Based on the disclosure provided herein, one of ordinary skill in the art will recognize a variety of memory types and/or combinations thereof that may be used to implement memory 176.

Figure 2:
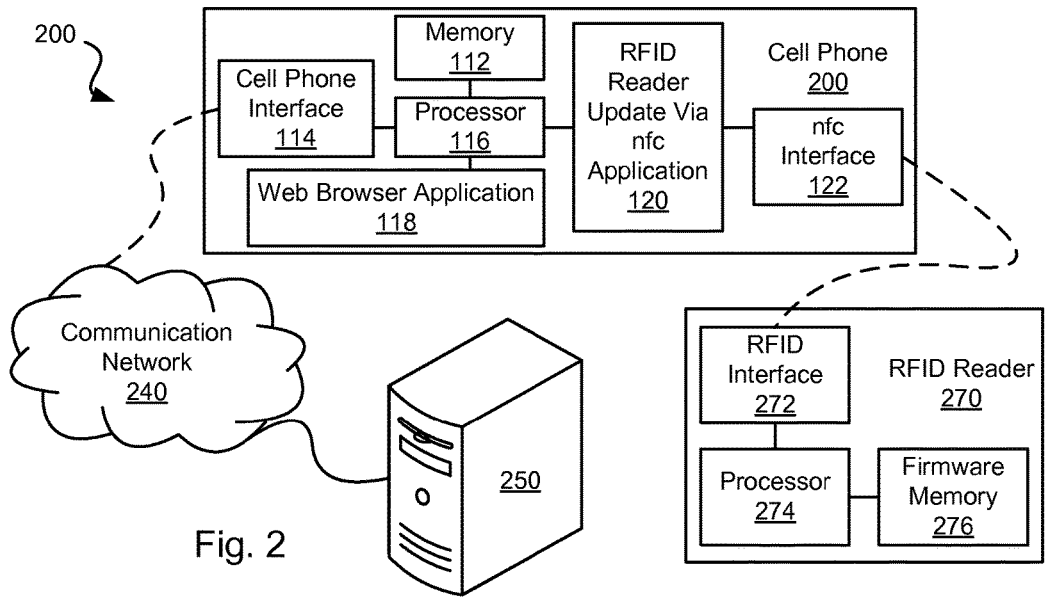
FIG. 2 shows a system for facilitating RFID reader updating using a portable update device in accordance with one or more embodiments of the present invention.

Turning to FIG. 2, an RFID reader update system 200 is shown in accordance with one or more embodiments of the present invention. RFID reader update system 200 includes a cellular telephone 200 that is communicably coupled to a server 250 via a communication network 240. In one implementation, communication network 240 includes a cellular telephone network. Server 250 provides a remote control that is capable of uploading information to cellular telephone 200. This uploaded information may then be downloaded to an RFID reader 270 once cellular telephone 200 is brought within a communicable proximity of RFID reader 270. RFID reader 270 includes an RFID interface 272, a processor 274 and firmware memory 276. RFID device 270 operates similar to that described in relation to RFID reader 150, except that there is no cellular telephone interface.

In operation, a command to update RFID reader 270 along with an RFID reader update is sent from server 250 to cellular telephone 200 via communication network 240. In some cases, the command to update RFID reader 270 is sent as a text message to cellular telephone 200 that may include, for example, instructions on where the target RFID reader(s) is located. In addition to the text message, an RFID reader update is sent to cellular telephone 200. In yet other cases, web browser application 118 of cellular telephone 200 may be used to request an RFID reader update from server 250. The received RFID reader update is directed by processor 116 to memory 112. Cellular telephone 200 is then moved within proximity of RFID reader 270. When cellular telephone 200 is within communicable proximity of RFID reader 270, RFID reader 270 and cellular telephone 200 begin a communication session using nfc interface 122 as is known in the art. The nfc interface 122 indicates the ongoing communication session to RFID reader update application 120, and in response, RFID reader update application 120 accesses the previously received RFID reader update from memory 112 and provides the RFID reader update to RFID reader 270 via nfc interface 122. As an example, the RFID reader update may include, but is not limited to, a first set of instructions that are operable to cause an RFID reader to write subsequent information to a defined location in the memory of the RFID reader. The RFID reader update also includes subsequent data that, in accordance with the preceding write instructions, is written to the defined location in the RFID reader memory. This subsequent information may be either data or firmware instructions designed to modify operation of the RFID reader. The RFID reader update finishes with a set of instructions closing off communication. Upon writing the RFID reader update to RFID reader 270, the operation of RFID reader 270 is changed to conform to the update.

Figure 3:
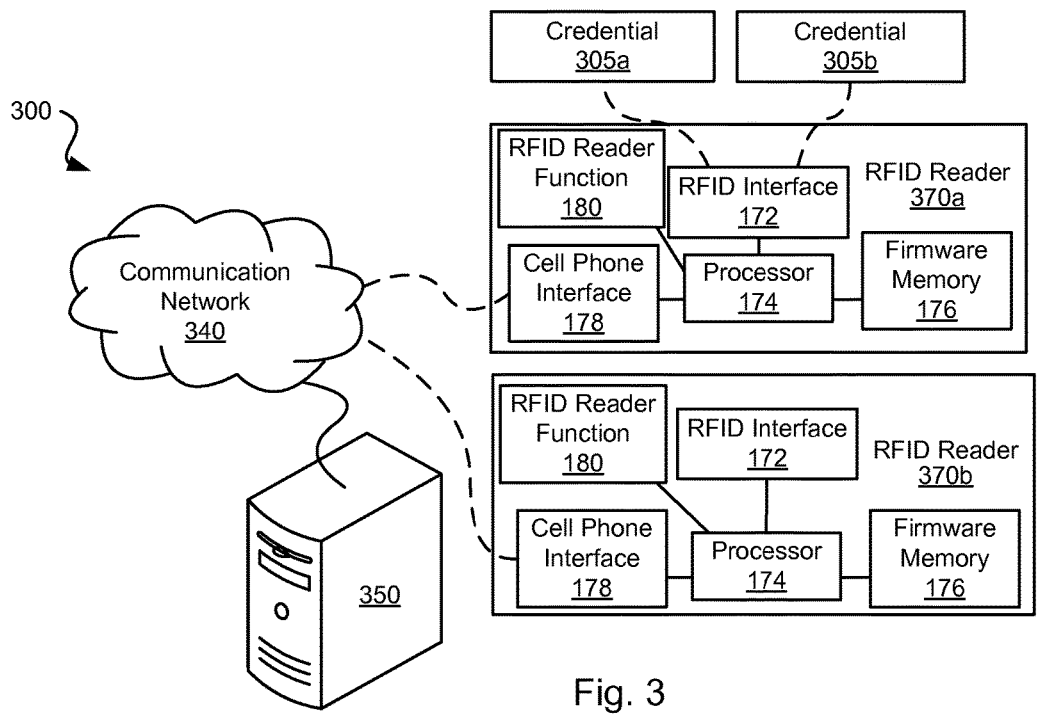
FIG. 3 depicts a system for facilitating direct RFID reader updating using an RFID reader incorporating a cellular telephone link in accordance with some embodiments of the present invention.

Turning to FIG. 3, an RFID reader update system 300 facilitating direct RFID reader updating using a cellular telephone link is shown in accordance with one or more embodiments of the present invention. RFID reader update system 300 includes a server 350 that is communicably coupled to one or more RFID readers 370 via a communication network 340. Similar to RFID reader 150, RFID readers 370 each include a cellular telephone interface 178 capable of receiving cellular telephone communications via communication network 340. Each of RFID readers 370 is further capable of authorizing one or more credentials 305 via RFID reader interface 172 that are brought within communicable proximity of the particular RFID reader 370.

In operation, an RFID reader update is sent from server 350 to a selected one of RFID readers 370 or to a group of RFID readers 370 via cellular telephone interfaces 178 that are included in each of the readers. The RFID reader update may include, for example, instructions on where in firmware memory 176 to write the update and the actual update. Once received, via cellular telephone interface 178, the RFID reader update is passed to processor 174. In turn, processor 174 writes the received RFID update the appropriate memory locations in firmware memory 176. Upon writing the RFID reader update to RFID reader(s) 370, the operation of RFID reader(s) 370 is changed to conform to the update.

Figure 4:
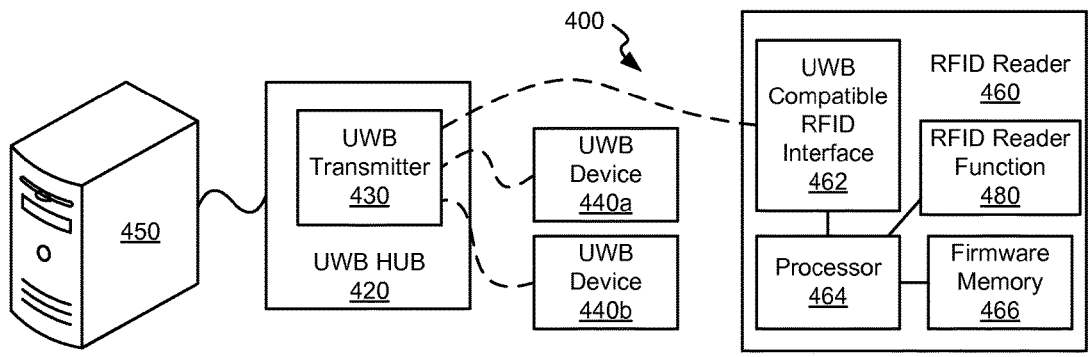
FIG. 4 depicts a system for facilitating direct RFID reader updating using an ultra wideband link in accordance with various embodiments of the present invention.

Turning to FIG. 4, an RFID reader update system 400 for facilitating direct RFID reader updating using an ultra wideband link is shown in accordance with various embodiments of the present invention. As shown, RFID reader update system 400 includes a server 450 that is communicably coupled to one or more RFID readers 460 via an ultra wideband hub 420. Ultra wideband hub 420 is capable of communicating with RFID reader 460, along with various other ultra wideband devices 440. Ultra wideband hub 420 includes an ultra wideband transmitter 430 that transmits various information to one or more devices capable of ultra wideband communications. As noted above, one of the devices is RFID reader 460 that includes an ultra wideband capable RFID interface 462. In some cases, RFID interface 462 is capable of receiving standard RFID communications along with ultra wideband communications using the same circuitry. RFID reader 460 further includes a processor 464, a firmware memory 466, and an RFID function 480. RFID function 480 is a control circuit that effectuates the function that is to be performed by RFID reader 460. Thus, for example, where RFID reader 460 is used to authorize access via a physical doorway, RFID reader function 480 provides an electronic unlock signal to a lock controlling access via the doorway when an authorized credential is brought within proximity of the RFID reader. Based upon the disclosure provided herein, one of ordinary skill in the art will recognize a variety of functions that may be implemented by RFID reader function 480.

In operation, an RFID reader update is sent from server 450 to RFID reader 460 via ultra wideband hub 420. The ultra wideband communication including the RFID reader update is received by ultra wideband capable RFID interface 462 and passed to processor 464. The RFID reader update may include, for example, instructions on where in firmware memory 176 to write the update and the actual update. Processor 464 writes the update to the appropriate location in firmware memory 466. Upon writing the RFID reader update to RFID reader 460, the operation of RFID reader 460 is changed to conform to the update.

Figure 5:
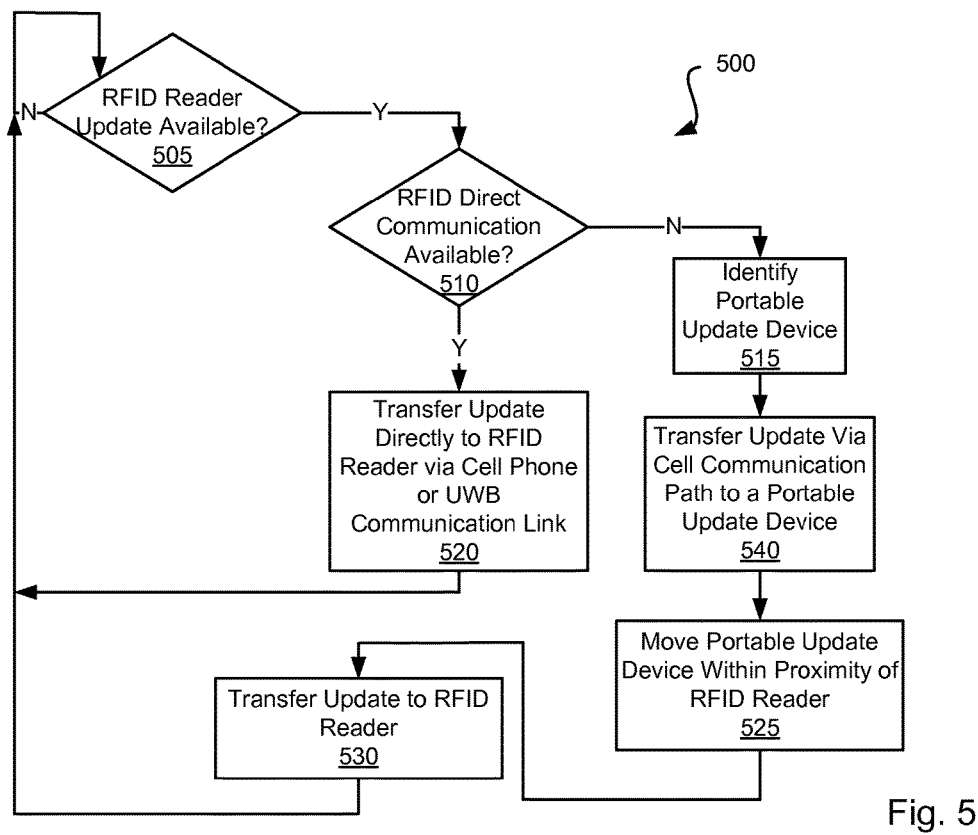
FIG. 5 is a flow diagram showing a method in accordance with one or more embodiments of the present invention for performing an RFID reader update.

Turning to FIG. 5, a flow diagram 500 depicts a method in accordance with one or more embodiments of the present invention for performing an RFID reader update. Following flow diagram 500, it is determined whether an RFID reader update is available (block 505). This may include, for example, identifying a new RFID reader update in a server supporting the update system. In some cases, determining that a new RFID reader update is available includes modifying an existing RFID reader program and identifying the program as an update. In various cases, identifying a new update may be initiated remotely by a technician using a cellular telephone to request a new update. It is then determined whether a direct update capability exists (block 510). Direct update capability provides an ability to communicate directly with an RFID reader via a communication network. Such direct update capability may be, for example, facilitated by a cellular telephone interface integrated into the RFID reader that is to be updated. As another example, direct updates may be facilitated by ultra wideband communication. Based upon the disclosure provided herein, one of ordinary skill in the art will recognize a variety of direct update approaches that may be used in relation to different embodiments of the present invention.

Where direct update capability exists (block 510), the RFID reader update is transferred to the identified RFID reader via the direct update interface (block 520). The transferred RFID reader update may include an initial set of instructions that are operable to cause an RFID reader to write subsequent information to a defined location in the memory of the RFID reader. The RFID reader update also includes subsequent data that, in accordance with the preceding write instructions, is written to the defined location in the RFID reader memory. This subsequent information may be either data or firmware instructions designed to modify operation of the RFID reader. The subsequent data may include, for example, replacement or additional authorization codes. As another example, the subsequent data may include firmware instructions causing the RFID reader to perform communications with presented credentials at additional frequencies. The RFID reader update may also include a final set of instructions closing off communication. Once the RFID reader update is transferred, the functionality of the receiving RFID reader is modified in accordance with the update.

Alternatively, where direct update capability does not exist (block 510), a portable update device is selected to perform the update (block 515). This may include, for example, selecting the cellular telephone of a technician in the general area of the RFID reader that is to be updated. As another example, where a request for an update is received from a technician, the cellular telephone of the technician may be chosen to perform the update. Once the portable update device is identified, the RFID reader update is transferred to the identified portable update device (block 540). This may include, for example, providing the RFID reader update to an identified cellular telephone via a cell communication link. The RFID reader update may indicate a particular RFID reader or class of RFID readers to which the RFID reader update is to be applied. In addition, a text message may be sent to the portable update device providing instructions for uploading the RFID reader update to an RFID reader. The portable update device is then moved within communicable distance of an RFID reader (block 525). By bringing the portable update device within communicable distance, an nfc communication is initiated between the portable update device and the RFID reader.

With communications with the RFID reader established, the portable update device pulls the previously received RFID reader update from memory and transfers it to the RFID reader (block 530). The transferred RFID reader update may include an initial set of instructions that are operable to cause an RFID reader to write subsequent information to a defined location in the memory of the RFID reader. The RFID reader update also includes subsequent data that, in accordance with the preceding write instructions, is written to the defined location in the RFID reader memory. This subsequent information may be either data or firmware instructions designed to modify operation of the RFID reader. The subsequent data may include, for example, replacement or additional authorization codes. As another example, the subsequent data may include firmware instructions causing the RFID reader to perform communications with presented credentials at additional frequencies. The RFID reader update may also include a final set of instructions closing off communication. Once the RFID reader update is transferred, the functionality of the receiving RFID reader is modified in accordance with the update.

Figure 6:
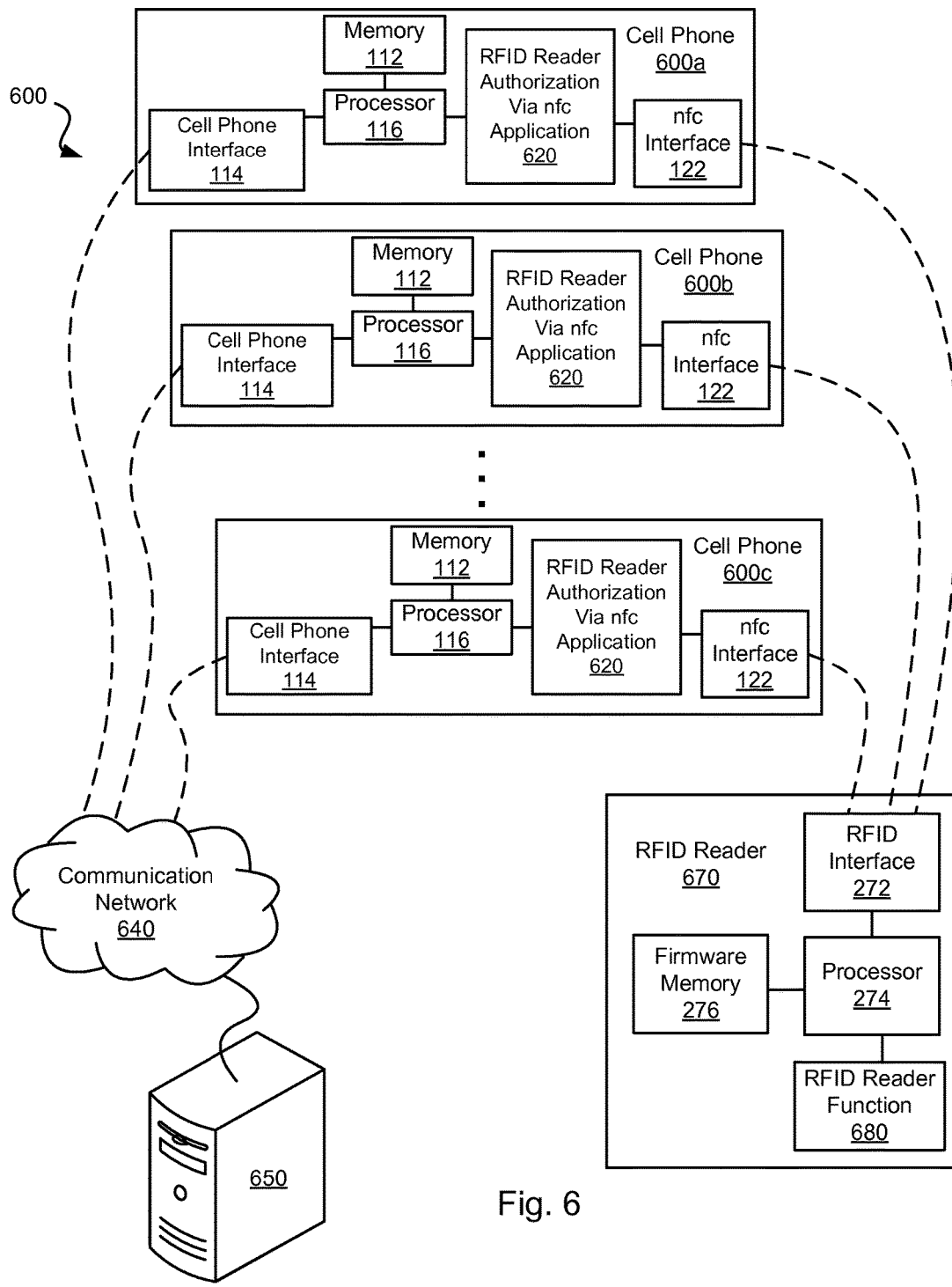
FIG. 6 shows a system in accordance with some embodiments of the present invention for performing a credential update.

Turning to FIG. 6, a credential update system 600 is depicted in accordance with some embodiments of the present invention. Credential update system 600 includes one or more cellular telephones 600 that are each communicably coupled to a server 650 via a communication network 640. In one implementation, communication network 640 includes a cellular telephone network. Server 650 is capable of processing requests to upload new or modified authorization codes to cellular telephone(s) 600. In some cases, server 650 may be used to modify access codes to many cellular telephones 600 as part of upgrading an access control system, or of providing an authorization code to a newly authorized credential or of modifying the authorization codes maintained by a currently authorized credential. The uploaded authorization codes are received from server 650 via cellular telephone interface 114. Cellular telephone interface 114 provides the received authorization code(s) to processor 116 that stores the received information to memory 112. When cellular telephone 600 is brought within communicable distance of an RFID reader 670, an nfc communication is initiated using nfc interface 122. Once initiated, nfc interface 122 requests authorization information from an RFID reader authorization application 620. RFID reader authorization application 620 pulls the uploaded authorization information from memory 112, and provides the authorization information to nfc interface 122. The authorization information is then provided to RFID interface 272 via the nfc communication channel. Where the authorization is recognized by RFID reader 670, the function of RFID reader 670 is triggered. Thus, for example, where RFID reader 670 is associated with a doorway, once the authorization is accepted, the door is opened. Based upon the disclosure provided herein, one of ordinary skill in the art will recognize a variety of RFID functions that may be performed by RFID reader 670.

Figure 7:
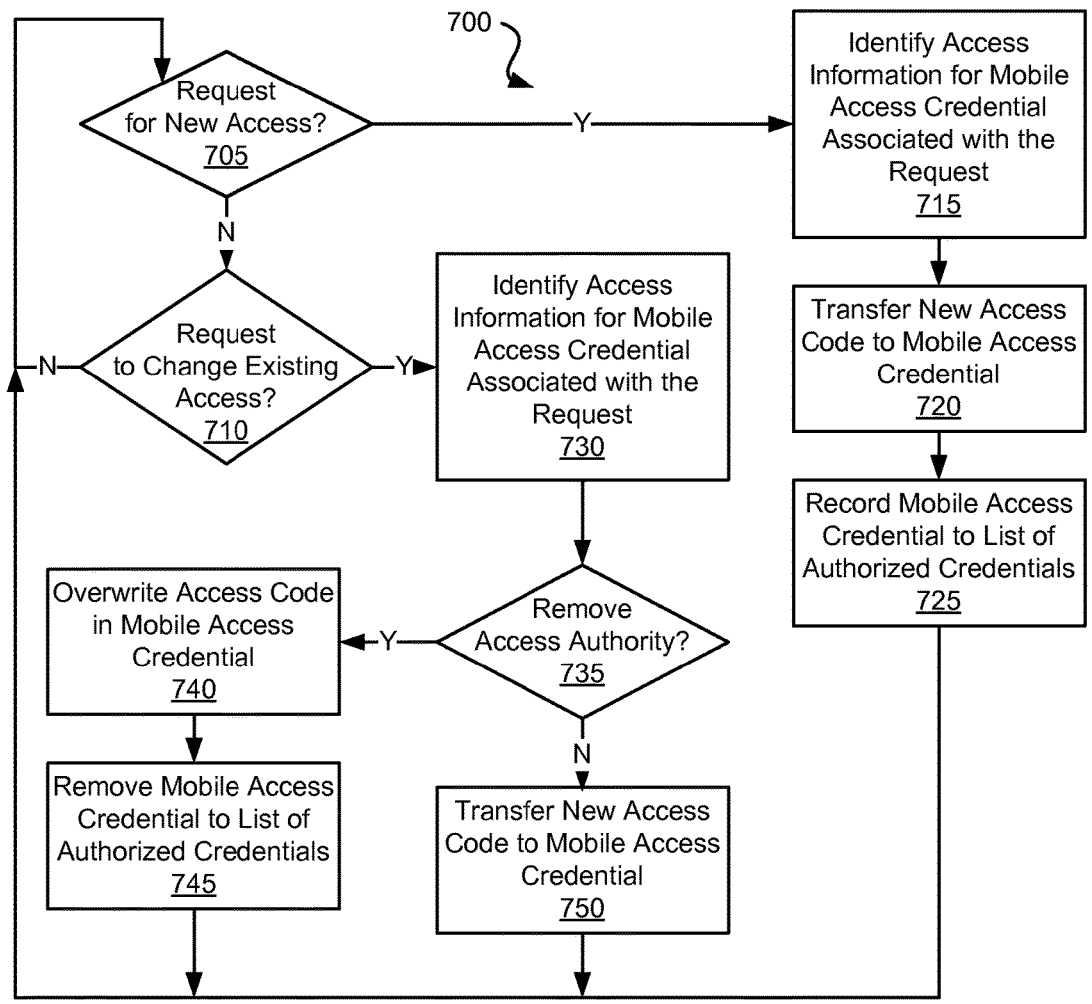
FIG. 7 is a flow diagram showing a method in accordance with one or more embodiments of the present invention for remotely updating credentials.

FIG. 7 is a flow diagram 700 showing a method in accordance with one or more embodiments of the present invention for remotely updating credentials. Following flow diagram 700, it is determined whether a request is received to authorize access via a new credential (block 705). Such a request may be entered, for example, via a server supporting a credential update system. Entry into the server may be done directly on the server, or remotely by calling in from a cellular telephone or via the Internet. Based upon the disclosure provided herein, one of ordinary skill in the art will recognize a variety of approaches that may be used for requesting new credential access. Where a request to authorize access via a new credential is received (block 705), access information for the new credential is identified (block 715). This access information may be, for example, included in the received request. As one example, where the credential is embodied in a cellular telephone, the access information may include the telephone number for the cellular telephone. Once the access information is identified (block 715), an authorization code(s) corresponding the requested access authorization is transferred to the credential (block 720). Where, for example, the credential is a cellular telephone, the authorization code(s) is received via the cell interface of the cellular telephone and stored to the memory of the cellular telephone. At this juncture, the credential is capable of authorizing to one or more RFID readers utilizing the authorization code(s). In addition to transferring the authorization code(s), the credential is identified on a list of credentials capable of accessing particular RFID readers that is maintained by the server (block 725).

Alternatively, where a request to authorize access via a new credential is not received (block 705), it is determined whether a request to modify an authorization code(s) in a currently authorized credential is received (block 710). Where such a request is received (block 710), access information for the credential is identified (block 730). This access information may be, for example, included in the received request. As one example, where the credential is embodied in a cellular telephone, the access information may include the telephone number for the cellular telephone. Once the access information is identified (block 730), it is determined whether one or ore authorization codes maintained by the credential are to be modified or whether one or more authorization codes are to be removed or revoked (block 735). Where existing authorization codes are to be removed or revoked (block 735), an upload is performed to the credential that operates to delete or overwrite the previously provided authorization code(s) maintained in the memory of the credential (block 740). Once this is completed, the credential is no longer able to authorize to the RFID readers associated with the request. Further, the credential is removed from a list of credentials capable of accessing particular RFID readers that is maintained by the server (block 745). Alternatively, where existing authorization codes are to be modified (block 735), an upload is performed to the credential that operates to overwrite the previously provided authorization code(s) maintained in the memory of the credential with the new authorization code(s) (block 750). Once this is completed, the credential is able to authorize to the RFID readers associated with the request using the modified information.

Figure 8:
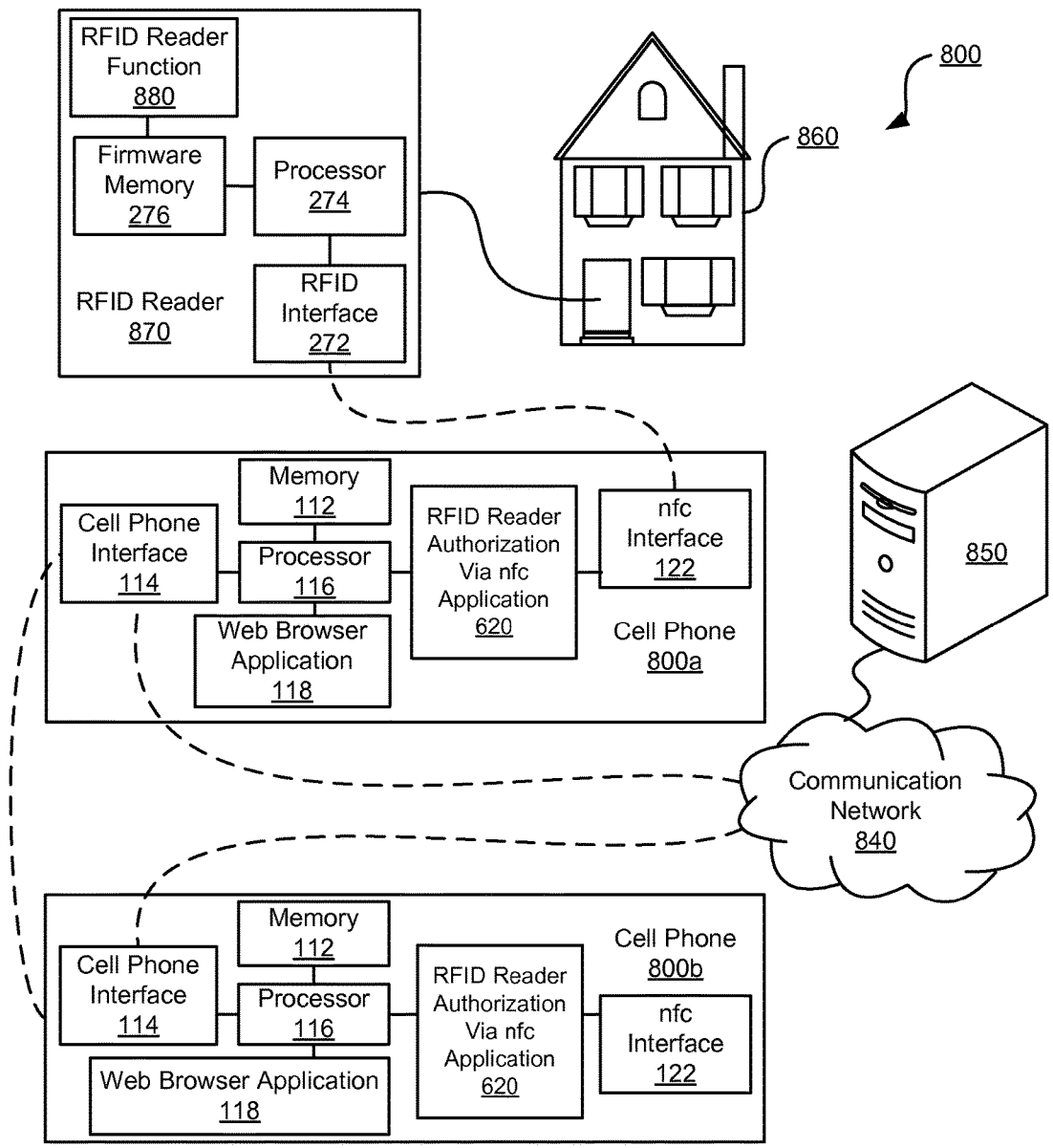
FIG. 8 shows a system in accordance with various embodiments of the present invention for performing a remote authorization of guest access.

Turning to FIG. 8, a remote authorization, guest access system 800 is depicted in accordance with some embodiments of the present invention. Remote authorization, guest access system 800 includes one or more cellular telephones 800 that are each communicably coupled to a server 850 via a communication network 840. In one implementation, communication network 840 includes a cellular telephone network. Server 850 is capable of receiving a request to grant or revoke authorization for a given credential, and to implement the request by accessing the identified credential. As an example, a request to access a location 860 may be sent from a guest via their cellular telephone 800*a* to a cellular telephone 800*b* of the owner of location 860. This request may be received as, for example, an audio conversation or a text message. The owner may then decide to grant the request or not. Where a decision is made to grant the request, the owner may send an authorization request to server 850 via communication network 840. The authorization request indicates to server 850 that cellular telephone 800*a* should be updated to allow access to location 860.

In response to the authorization request, server 850 uploads an authorization code(s) for an RFID reader 870 to cellular telephone 800*a*. The uploaded authorization code(s) are received from server 850 via cellular telephone interface 114. Cellular telephone interface 114 provides the received authorization code(s) to processor 116 that stores the received information to memory 112. When cellular telephone 800 is brought within communicable distance of RFID reader 870, an nfc communication is initiated using nfc interface 122. Once initiated, nfc interface 122 requests authorization information from RFID reader authorization application 620. RFID reader authorization application 620 pulls the uploaded authorization information from memory 112, and provides the authorization information to nfc interface 122. The authorization information is then provided to RFID interface 272 via the nfc communication channel. Where the authorization is recognized by RFID reader 870, an RFID reader function 880 is triggered. In this case, RFID reader function 880 operates to grant access to location 860 by unlocking a door where an authorized credential is presented.

Figure 9:
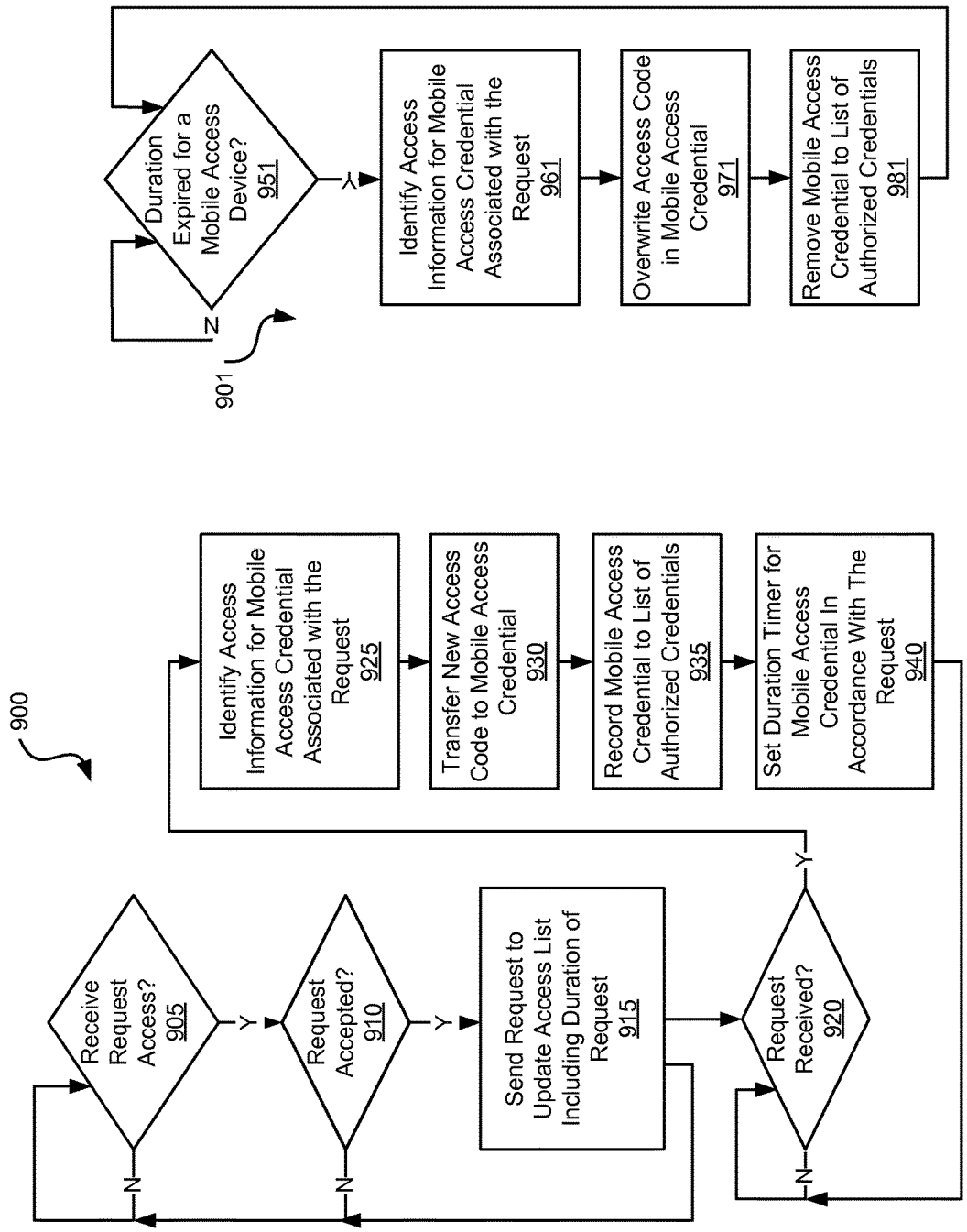
FIG. 9 is a flow diagram showing a method in accordance with one or more embodiments of the present invention for remote authorization of guest access.

Turning to FIG. 9, a flow diagram 900 shows a method in accordance with one or more embodiments of the present invention for remote authorization of guest access. Following flow diagram 900, a request for access is received (block 905). This may include, for example, receipt of a request from a potential guest to access a particular property. The guest may be, but is not limited to, a realtor trying to show a property, a friend trying to access a residence when the owner is not home, or a client trying to access a condominium that they have rented. Based upon the disclosure provided herein, one of ordinary skill in the art will recognize a variety of guests that may be granted access to a location. It should further be noted that while access is being discussed in relation to a property, that access could be granted to, for example, an item. Based on the disclosure provided herein, one of ordinary skill in the art will recognize a variety of properties, items and/or operations to which a guest may request access.

The request is provided to an authorized entity or person that determines whether to grant the request (block 910). For example, where the request is to access a residence, the request may be sent to the owner of the residence. In some cases, the authorized entity may be a computer capable of determining whether the requestor should be authorized.

Where the request is accepted by the authorized person or entity (block 910), an authorization request is sent by the authorizing party to a server supporting a remote authorization, guest access system (block 915). The request may be, for example, in the form of a text message to the server that the server is able to automatically parse and authorize. Alternatively, the authorizing party may use a web browser to access the server and authorize the grant of access. A typical authorization request includes access information for the credential that is to be authorized, a duration of the authorization, and information capable of assuring that the party submitting the authorization request has authority to grant access. Based upon the disclosure provided herein, one of ordinary skill in the art will recognize a variety of mechanisms that may be used to provide a request to grant access to the server supporting a remote authorization, guest access system.

Once the request is received at the server (block 920), the server parses the request to identify access information for the credential that is to be authorized (block 925). As one example, where the credential is embodied in a cellular telephone, the access information may include the telephone number for the cellular telephone. Once the access information is identified (block 925), an authorization code(s) corresponding the requested access authorization is transferred to the credential (block 930). Where, for example, the credential is a cellular telephone, the authorization code(s) is received via the cell interface of the cellular telephone and stored to the memory of the cellular telephone. At this juncture, the credential is capable of authorizing to one or more RFID readers utilizing the authorization code(s). In some cases, transferring the authorization code(s) further includes sending a message (e.g., voice or text) to both the authorizing party and the guest. In some cases, this may be to the cellular telephones of the two parties, or to some other designated message area such as a remote email tool. Then newly authorized credential is identified on a list of credentials capable of accessing the RFID reader associated with the request that is maintained by the server (block 935). Further, where the duration of the authorization is finite, that duration is recorded and monitored by the server (block 940). As an example, an authorization may be granted to a guest for a three day period. Based upon the disclosure provided herein, one of ordinary skill in the art will recognize appropriate durations depending upon the particular scenario.

As shown in a flow diagram 901, the server continues to monitor the duration of the authorization. When the duration expires (block 951), the server identifies the access information for the credential (block 961). The access information is used to access the credential and overwrite or otherwise revoke the previously provided authorization code(s) (block 971). Once the revocation is complete, the credential is no longer capable of authorizing itself to the RFID reader. With this complete, the credential is removed from the server maintained list of credentials capable of accessing the RFID reader associated with the request (block 981).

Figure 10:
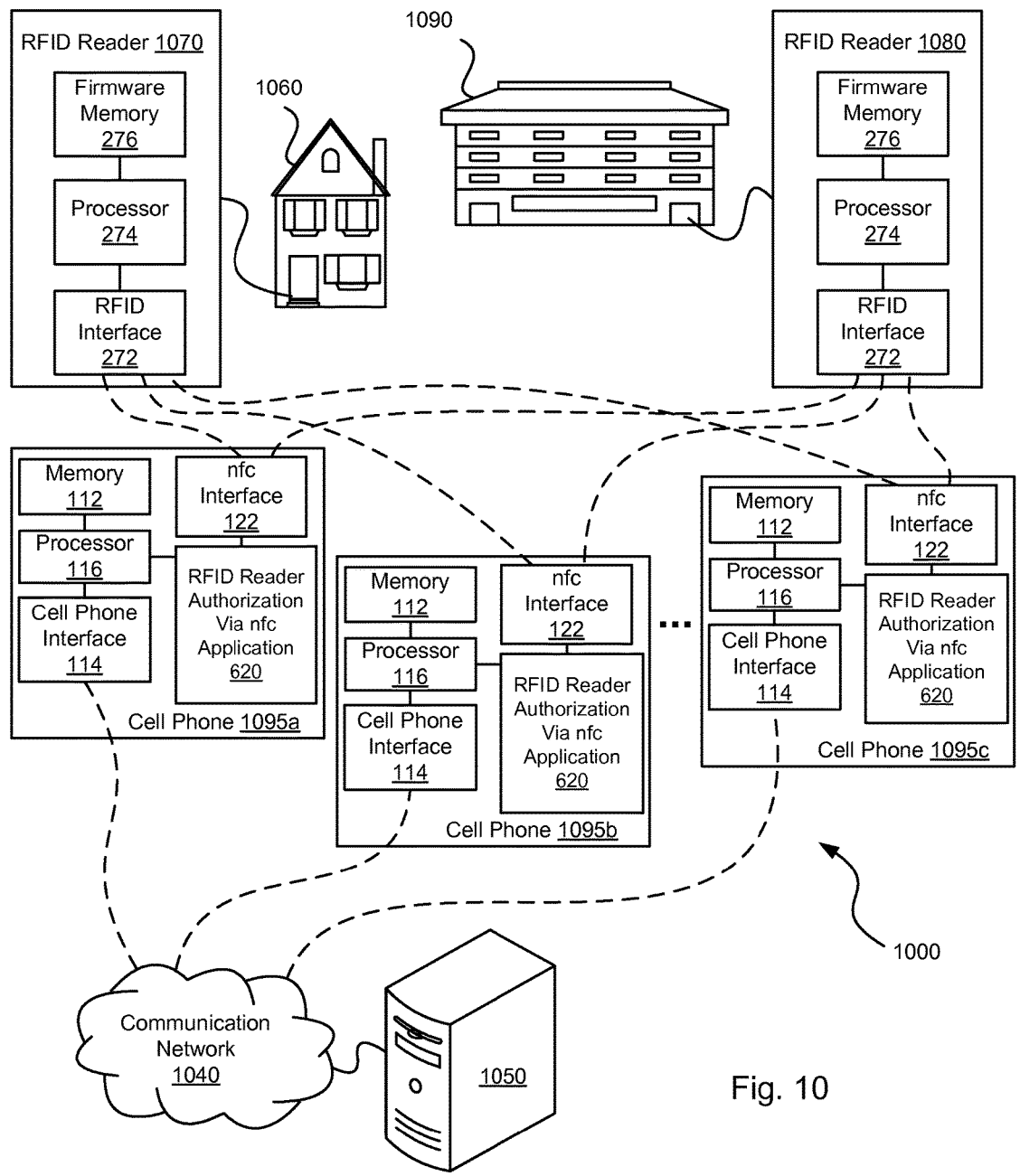
FIG. 10 depicts a system in accordance with some embodiments of the present invention for providing access security.

Turning to FIG. 10, an emergency access security system 1000 is depicted in accordance with various embodiments of the present invention. Emergency access security system 1000 includes one or more cellular telephones 1095 that are each communicably coupled to a server 10950 via a communication network 1040. In one implementation, communication network 1040 includes a cellular telephone network. Server 1050 is capable of receiving a request to grant or revoke authorization for a given credential, and to implement the request by accessing the identified credential. As an example, all of cellular telephones 1095 may be held by employees of a company operating at a facility 1090. Access to facility 1090 is controlled by an RFID reader 1080. As such, cellular telephones 1095 are originally capable of authorizing to RFID reader 1080. An emergency associated with the company or region in which the company is operating may be detected. In such a case, it may be the company's desire to direct its employees to a safe house 1060. In such a case, server 1050 may upload a text message to each of cellular telephones 1095 instructing the employee holding that phone to report to safe house 1060. In addition, server 1050 uploads an authorization code enabling cellular telephones 1095 as access credentials capable of authorization to an RFID reader 1070 controlling access to safe house 1060. The authorization code is provided via cellular telephone interface 114 and stored to memory 112.

Once the newly enabled cellular telephone 1095 is brought within communicable proximity of RFID reader 1070, an nfc communication is initiated using nfc interface 122. Once initiated, nfc interface 122 requests authorization information from an RFID reader authorization application 620. RFID reader authorization application 620 pulls the uploaded authorization information from memory 112, and provides the authorization information to nfc interface 122. The authorization information is then provided to RFID interface 272 via the nfc communication channel. Where the authorization is recognized by RFID reader 1070, access to safe house 1060 is granted by unlocking a door associated with RFID reader 1070.

Turning to FIG. 11, a flow diagram 1100 shows a method in accordance with one or more embodiments of the present invention for emergency location access authorization. Following flow diagram 1100, an emergency condition is identified (block 1105). This may include, for example, identifying a state of emergency in a city where a multi-national company does business. An access enable request is prepared for any personnel that may be affected by the identified emergency condition (block 1110). Such an access enable request may include, for example, directions to a safe house, one or more authorization codes allowing access to the safe house, and a list of access information for credentials held by personnel that may be affected by the emergency situation. This information is sent to a server supporting an emergency access security system (block 1115).

Once the request is received at the server (block 1120), the server parses the request to select the first credential in the list (block 1125) and to identify access information for that credential (block 1130). As an example, where the credential is embodied in a cellular telephone, the access information may include the telephone number for the cellular telephone. Once the access information is identified (block 1130), an authorization code(s) corresponding the requested access authorization is transferred to the credential (block 1135). Where, for example, the credential is a cellular telephone, the authorization code(s) is received via the cell interface of the cellular telephone and stored to the memory of the cellular telephone. At this juncture, the credential is capable of authorizing to one or more RFID readers utilizing the authorization code(s). In some cases, transferring the authorization code(s) further includes sending a message (e.g., voice or text) to the party holding the credential guest. This message may include, for example, instructions on the location of the safe house. The newly authorized credential is identified on a list of credentials capable of accessing the RFID reader associated with the request that is maintained by the server (block 1140). It is then determined whether there is another credential on the list that remains to be authorized (block 1145). Where there is another credential to be authorized (block 1145), the next credential is selected (block 1150) and the processes of blocks 1130-1140 are repeated for the additional credential.

Figure 12:
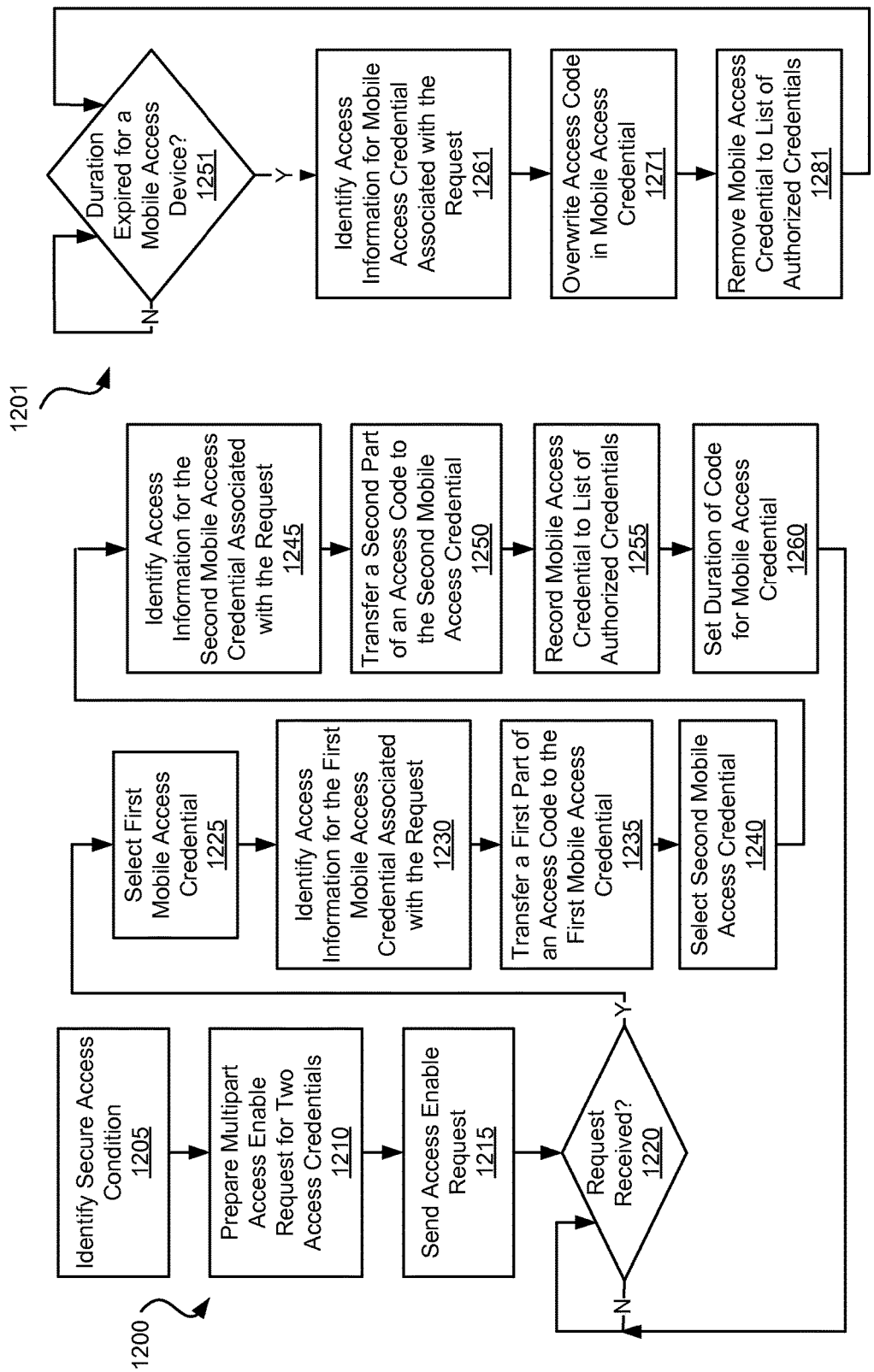
FIG. 12 is a flow diagram showing a method in accordance with some embodiments of the present invention for multi-part credential updating.

Turning to FIG. 12, a flow diagram 1200 shows a method in accordance with some embodiments of the present invention for multi-part credential updating. Following flow diagram 1200, a secure access condition is identified (block 1205). This may include, for example, receiving a request to access a secure location or secure information by a party. In some such cases, heightened security is imposed that requires two authorized individuals to operate together when accessing the secure location. In such a case, a multipart access enable is prepared (block 1210). The multipart request includes an authorization code that is to be provided to one credential and another authorization code that is to be provided to another credential. In addition, the multipart request may include a duration associated with the authorization. Only when both credentials simultaneously within communicable distance of an RFID reader will the RFID reader grant access. As such, the RFID reader enforces the two person security. The multipart access enable is provided to a server supporting a secure access system.

Once the request is received at the server (block 1220), the server parses the request and selects the first credential (block 1225). Access information for the first credential is identified (block 1230) and the first part of the multipart authorization code is provided to the identified credential (block 1235). As one example, where the first credential is embodied in a cellular telephone, the access information may include the telephone number for the cellular telephone. The transferred authorization code(s) is received via the cell interface of the cellular telephone and stored to the memory of the cellular telephone. At this juncture, the first credential is capable of authorizing to one or more RFID readers utilizing the authorization code(s) assuming the second credential is simultaneously within communicable distance. The second credential is selected (block 1240). Access information for the second credential is identified (block 1245) and the second part of the multipart authorization code is provided to the identified credential (block 1250). As an example, where the second credential is embodied in a cellular telephone, the access information may include the telephone number for the cellular telephone. The transferred authorization code(s) is received via the cell interface of the cellular telephone and stored to the memory of the cellular telephone. At this juncture, the second credential is capable of authorizing to one or more RFID readers utilizing the authorization code(s) assuming the first credential is simultaneously within communicable distance. The newly authorized credentials are identified on a list of credentials capable of accessing the RFID reader associated with the request that is maintained by the server (block 1255). Further, where the duration of the authorization is finite, that duration is recorded and monitored by the server (block 1260).

As shown in a flow diagram 1201, the server continues to monitor the duration of the authorization. When the duration expires (block 1251), the server identifies the access information for the credential (block 1261). The access information is used to access the credential and overwrite or otherwise revoke the previously provided authorization code(s) (block 1271). Once the revocation is complete, the credential is no longer capable of authorizing itself to the RFID reader. With this complete, the credential is removed from the server maintained list of credentials capable of accessing the RFID reader associated with the request (block 1281).

In conclusion, the present invention provides novel systems, devices, methods and arrangements for upgrading and/or accessing RFID readers. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A credential reader update system, the system comprising:
  a server operable to provide a credential reader update via a cellular telephone interface;
  a plurality of credential readers, each credential reader operable to communicate with a presented credential at a credential reader frequency, wherein each credential reader has a credential reader interface having a credential reader interface range;
  a portable update device selectively movable into and out of the credential reader interface range, wherein the portable update device is operable to receive the credential reader update via the cellular telephone interface; and
  a credential reader update application included in the portable update device, the credential reader update application operable to uniquely identify the particular credential reader to be updated, and wherein the portable update device is operable to transfer the credential reader update to the credential reader via the credential reader interface, and wherein the credential reader update includes firmware instructions that cause the credential reader to perform communications with the presented credential at a second frequency different than the credential reader frequency.

2. The credential reader update system of claim 1, wherein the portable update device is a cellular telephone.

3. The credential reader update system of claim 1, wherein the credential reader interface operates at 13.56 MHz.

4. The credential reader update system of claim 1, wherein the credential reader update causes a change in an authorization code of the credential reader.

5. The credential reader update system of claim 1, wherein the credential reader is associated with an access point, and wherein by authorizing a credential to the credential reader the access point is opened.

6. The credential reader update system of claim 1, wherein the credential reader includes a processor, and wherein the credential reader update includes instructions executable by the processor to modify the function performed by the credential reader.

7. The credential reader update system of claim 1, wherein the portable update device transmits authorization information at a first frequency, wherein the credential reader is operable to receive authorization information at the credential reader frequency, and wherein the credential reader update renders the credential reader able to receive authorization information at the first frequency.

8. The credential reader update system of claim 1, wherein the credential reader is implemented as part of a point of sale device.

9. A method for updating a credential reader that is operable to read a presented credential at a credential reader frequency, the method comprising:

transferring a credential reader update to a portable update device via a cellular telephone interface, the portable update device movable into and out of a credential reader interface range;

detecting the portable update device within the credential reader interface range of the credential reader;

determining if the credential reader is a particular credential reader that is to be updated; and transferring the credential reader update to the credential reader via the credential reader interface in response to a positive determination that the credential reader is the particular credential reader that is to be updated, wherein the credential reader operates consistent with the credential reader update, and wherein the credential reader update includes firmware instructions that cause the credential reader to perform communications with the presented credential at a second frequency in addition to the credential reader frequency.

10. The method of claim 9, wherein the credential reader update causes a change in an authorization code of the credential reader.

11. The method of claim 9, wherein the credential reader is associated with an access point, and wherein by authorizing a credential at the credential reader the access point is opened.

12. The method of claim 11, wherein the credential reader update renders the credential unauthorized.

13. The method of claim 11, wherein the credential reader update renders the credential authorized.

14. The method of claim 11, wherein the credential transmits authorization information at a credential reader frequency, wherein the credential reader is operable to receive authorization information at the credential reader frequency, and wherein the credential reader update renders the credential reader able to receive authorization information at the second frequency.

15. The method of claim 9, wherein the credential reader is implemented as part of a point of sale device.

16. The method of claim 9, wherein the portable update device is a cellular telephone, and wherein the cellular telephone supports near field communication.

17. The method of claim 16, wherein the near field communication are used to transfer the credential reader update to the credential reader using a programming frequency and protocol recognized by the credential reader.

18. A remote access system comprising:
a credential reader;
a credential having a first communication interface that communicates using a cellular telephone network and a second communication interface that is different than the first communication interface, the credential operable to receive authorization information and to communicate with the credential reader;
a server operable to receive an authorization request for the credential and to access the credential to provide the authorization information;
a portable device operable to send the authorization request to the server from the credential; and
a reader authorization application included in the credential, wherein the credential is operable to transfer an authorization code to the credential reader via the second communication interface that is different than the first communication interface, wherein the portable device is separate from the credential.

19. The remote access system of claim 18, wherein the credential is a cellular telephone.

20. The remote access system of claim 18, wherein the second communication interface operates at 13.56 MHz.

21. The remote access system of claim 18, wherein the credential reader is associated with an access point, and wherein by transferring an authorization code to the credential reader, access to the access point is granted.

22. A method for remotely authorizing access, the method comprising:
transferring a request for access from a credential to a portable device which is separate from the credential;
determining a grant of access;
sending an authorization request from the portable device to a server, the authorization request identifying the grant of access;
uploading authorization information for a credential reader to the credential;
initiating a communication with a credential reader interface in response to positioning the credential within a credential reader interface range of the credential reader;
requesting authorization information from the credential; and
transferring the authorization information from the credential to the credential reader via the credential reader interface.

23. The method of claim 22, wherein uploading authorization information includes receiving the authorization information via a cellular telephone interface.

24. The method of claim 22, wherein requesting authorization information from the credential includes requesting information from a credential reader authorization application within the credential.

25. The method of claim 22, further including transferring the authorization information from a memory of the credential to the credential reader via the credential reader interface.

* * * * *